Patented Nov. 5, 1946

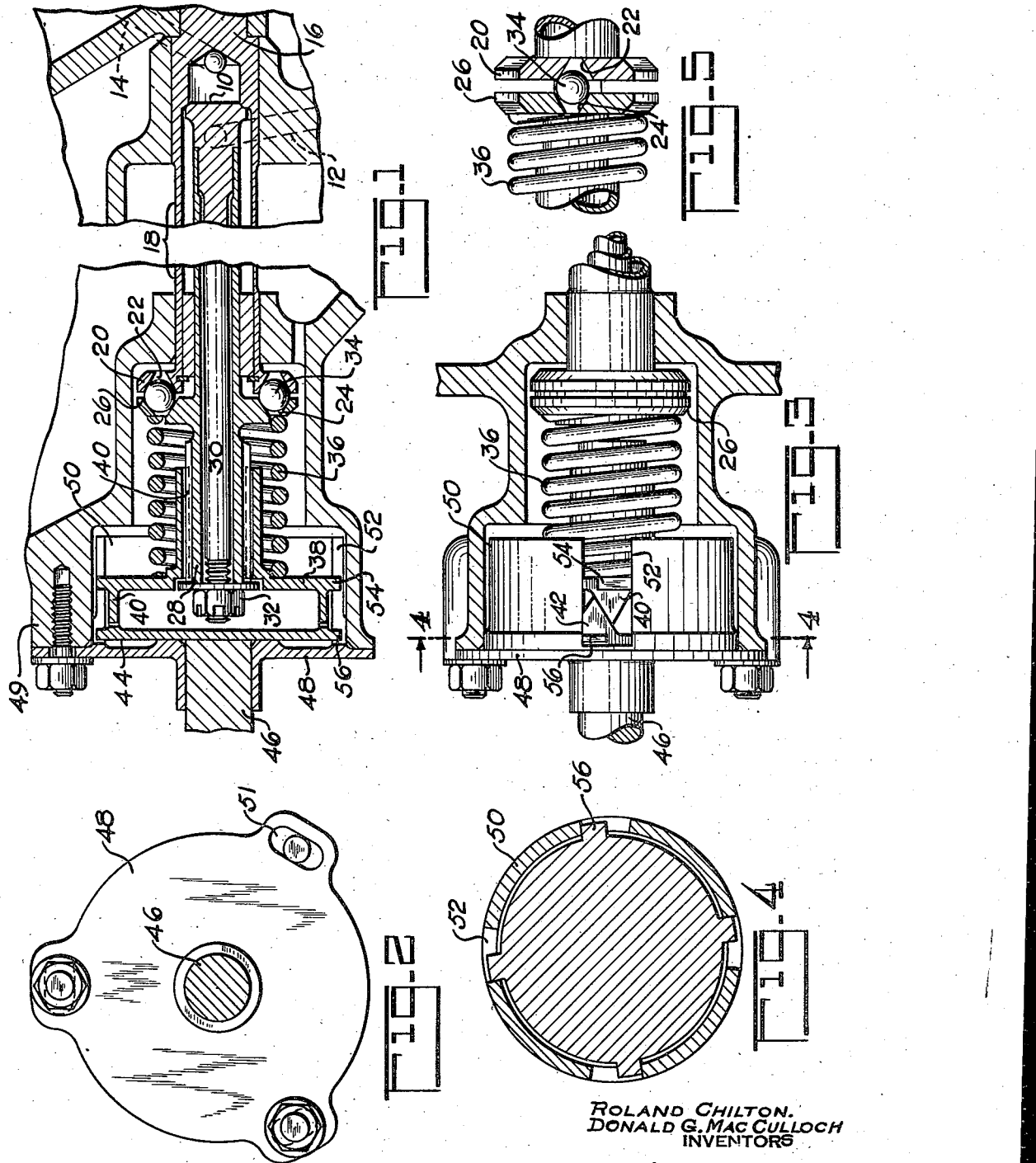

2,410,631

UNITED STATES PATENT OFFICE 2,410,631

CONTROL MECHANISM

Roland Chilton, Ridgewood, and Donald G. MacCulloch, Hawthorne, N. J., assignors to Wright Aeronautical Corporation, a corporation of New York Application March 22, 1943, Serial No. 480,118

2 Claims. (Cl. 74—97)

This invention relates to control mechanism in which a control handle is operative to insure a predetermined movement of a control member. The invention is of general application and the co-pending application, Serial No. 480,117, filed March 22, 1943, of Roland Chilton, illustrates one application of this invention.

It is an object of this invention to provide a shiftable control in which it is impossible for the operator to so manipulate the control handle that the member controlled thereby dwells in some intermediate position. In other words, the control automatically insures a predetermined movement of a control member.

Other objects of the invention will become apparent from reading the annexed detailed description in connection with the drawing, in which:

Fig. 1 is an axial section through the control mechanism;

Fig. 2 is an end view of Fig. 1;

Fig. 3 is a section through the mechanism housing illustrating the control elements in elevation;

Fig. 4 is a section on the line 4—4 of Fig. 3; and

Fig. 5 is a partial sectional view of a portion of Fig. 1.

Referring to the drawing, the control mechanism comprises a valve 10 supplied with a primary source of fluid pressure through a line 12 and controlling the flow therefrom through a line 14. A control shaft 16 provides a seat for the valve 10 and has a hollow extension 18 provided with a radial flange 20 in which are formed several circumferentially spaced conical pockets 22. Similar and opposed conical pockets 24 are formed in a flange 26 on a valve stem sleeve 28 secured about an extension of the valve stem 30 by a nut 32. Balls 34 are engaged between the pockets, and a spring 36 normally keeps the valve seated and continuously urges the flange 26 toward the flange 20 to keep the balls 34 seated in the pockets.

Assuming for the moment that the shaft 16 is fixed, then upon a predetermined rotative movement of the valve stem 30 relative to the shaft 16 (to the position illustrated in Fig. 5), the balls 34 will force the valve stem to the left against the bias of spring 36 to open the valve 10. In this position spring 36 acting through the balls 34 and their conical pockets exerts a turning effort on the control shaft 16 in a direction to re-align the conical pockets 22 and 24. Then with the valve stem 30 held against rotation, if the rotative restraint of the control shaft 16 is released, the spring 36 will be operative to re-align the conical pockets and return the valve to its normally closed position. As fully disclosed in the above cited co-pending application, the valve 10 controls the supply of oil to a fluid coupling device to initiate an automatic speed shifting operation in a multi-speed transmission and upon completion of a phase of this shifting operation the shaft 16, which is normally restrained from rotation by this transmission, is rotated by the spring 36, as described above, to again close the valve 10. This specific automatic shift mechanism requires that a predetermined movement be imparted to the control shaft for each shift. Therefore, it is essential that means be provided to impart a predetermined rotative movement to the valve stem for initiating each shift and that said means renders it impossible for the operator to effect only a partial movement of the valve stem. The invention herein disclosed is particularly directed to this latter means. However, it should be noted that this invention is of general application and that the above mentioned means operated or controlled by the valve 10 and shaft 16 is but one application of the invention.

For imparting a predetermined rotative movement to the valve stem 30, this stem is operatively connected to a member 38 by splines 40, and the member 38 is formed with an annular disc portion, the periphery of which is provided with axially extending V-shaped cams each having annular faces, as illustrated in Fig. 3. Cooperating cams 42 are formed on a companion disc 44 integral with a primary control shaft 46 to which a suitable control lever (not shown) is applied. The number of such pairs of cams is a matter of choice. The assembly is retained in position by a cover plate 48 bolted to the housing structure 49, and elongated slots 51 permit initial rotational adjustment of this plate. The plate 48 has an inward cylindrical extension 50 provided with slots 52, and the control disc 38 is provided with lugs 54 cooperating with these slots to limit the angular control travel of the disc 38 to the desired amount. Similar but narrower lugs 56 on disc 44 permit a somewhat greater angular motion of the primary control shaft 46. In the position shown in Fig. 3, it will be seen that the particular driven cam 40, visible in Fig. 3, is below the driving cam 42 and that the axial pressure of the spring 36 is forcing the lug 54 downwards and the lug 56 upwards against respective sides of the slots 52, thereby retaining the parts in the position shown. To shift to the other position, the primary control shaft 46 is rotated to move the cam 42 and lug 56 downwardly of Fig.

3 which will force the cam 40 and the disc 38 to the right against the pressure of the spring 36 until the cams pass their point-to-point position. Thereupon the reaction from the spring pressure on the cams will promptly snap the disc 38 to the left forcing the cam 40 upwardly from its position illustrated in Fig. 3 and completing the downward travel of the cam 42 until both motions are arrested, with the respective lugs 54, 56 again forced to the limit of their travel within the slots 52 and again holding the parts firmly in shifted position.

This control movement of the cams 40 and 42 shifts the control member 26 to the thus predetermined position illustrated in Fig. 5 to open valve 10. Also, this particular snap-action control insures that the full control travel is realized at each shift of the primary control shaft 46 and makes it impossible for the operator to cause the control member 26 to dwell in an intermediate position because the cams 42 and 40 are unstable in their point-to-point position. Furthermore, the turning force applied to the ball connection 26, 24, 20, through which the shaft 16 and control valve 10 are operated, is predetermined by the strength of the spring 36 and is not subject to the vagaries of an operator.

It should be noted that the above described control is not limited to use with the multi-speed mechanism described in the above mentioned application of Roland Chilton, but is of general application, i. e., the control may be used with any mechanism to which it is desired to impart a predetermined control movement.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In combination, first and second coaxial control members rotatably and axially movable relative to each other, resilient means biasing said control members to a normal relative position, relative rotation of the first of said control members being operative to cause a relative axial displacement of said members and to urge said second member in the same rotative direction to restore the normal relative position of said first and second members, and means to impart a predetermined rotative movement to said first control member, said means comprising a pair of movable members urged toward each other by said resilient means, each of said pair of members having a cam with outwardly converging sides projecting therefrom toward the other of said pair of members, the sides of said cams being engageable and said resilient means being operative through said engaging cam sides to urge said members in opposite directions, one of said pair of members being connected to said first control member.

2. In combination, first and second coaxial members rotatably and axially movable relative to each other, spring means biasing said members to a normal relative position, relative rotation of the first of said members being operative to cause a relative axial displacement of said members and to urge said second member in the same rotative direction to restore the normal relative position of said first and second members, and means to impart a predetermined rotative movement to said first member comprising a pair of rotatable members, one of said pair of members being connected to said first control member, cam means carried by each of said pair of members, said spring means urging said pair of members toward each other to effect engagement of said cam and being automatically operative through said engaging cams to effect rotation of said one of said pair of members to a desired position after rotation of the other of said pair of members beyond a predetermined position.

ROLAND CHILTON.
DONALD G. MacCULLOCH.